United States Patent
Firnhaber

(10) Patent No.: US 9,789,636 B2
(45) Date of Patent: Oct. 17, 2017

(54) RIGID AND ROTATABLE VANES MOLDED WITHIN VARIABLY SHAPED FLEXIBLE AIRFOILS

(71) Applicant: UNITED TECHNOLOGIES CORPORATION, Hartford, CT (US)

(72) Inventor: Michael C Firnhaber, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 714 days.

(21) Appl. No.: 14/282,148

(22) Filed: May 20, 2014

(65) Prior Publication Data
US 2015/0159501 A1    Jun. 11, 2015

Related U.S. Application Data

(60) Provisional application No. 61/830,343, filed on Jun. 3, 2013.

(51) Int. Cl.
| | |
|---|---|
| *F01D 17/16* | (2006.01) |
| *B29C 45/14* | (2006.01) |
| *B29K 19/00* | (2006.01) |
| *B29L 31/08* | (2006.01) |
| *B29K 83/00* | (2006.01) |

(52) U.S. Cl.
CPC .. *B29C 45/14065* (2013.01); *B29C 45/14467* (2013.01); *F01D 17/162* (2013.01); *B29K 2019/00* (2013.01); *B29K 2083/005* (2013.01); *B29L 2031/08* (2013.01); *B29L 2031/082* (2013.01)

(58) Field of Classification Search
CPC .......... F01D 17/16; F02C 3/06; F04D 27/002; F04D 19/00; B29C 31/008; B29K 2019/00
See application file for complete search history.

(56) References Cited

U.S. PATENT DOCUMENTS

| | | | | |
|---|---|---|---|---|
| 3,237,918 | A | * 3/1966 | Le Bell | F01D 17/162 415/156 |
| 3,614,260 | A | 10/1971 | Ellinger | |
| 3,723,021 | A | 3/1973 | Bartholomew | |
| 4,733,624 | A | * 3/1988 | Belvedere | B63H 9/0642 114/102.25 |

(Continued)

*Primary Examiner* — Mark Laurenzi
*Assistant Examiner* — Shafiq Mian
(74) *Attorney, Agent, or Firm* — Bachman & LaPointe, PC

(57) ABSTRACT

Airfoils (12) are molded of material (28), such as silicon rubber, which is fluent during molding, becoming solid and compliant at temperatures of use, with rigidly fixed vanes (25) and rotatable vanes (26), as inserts which are co-molded within the airfoil. The inserts are pre-prepared of either stiff or semi-stiff material to suit the intended needs of the airfoil. Then, with inserts in place within a mold, the airfoil is molded of compliant material. At least one of the inserts (26) is rotatable so as to force at least some portion of the compliant airfoil to alter camber, the compliant material between the inserts smoothing out the surface of the airfoil. The airfoils thus molded are then inserted between the inner hub (18) and the outer ring (22) of the rotary machine in which a fan or compressor is being constructed. Rods of the movable vanes extend to a unison ring connected (32) to rotate the vanes.

10 Claims, 3 Drawing Sheets

(56) References Cited

U.S. PATENT DOCUMENTS

| | | | | |
|---|---|---|---|---|
| 4,741,665 A * | 5/1988 | Hanser | ............... | F01D 17/162 |
| | | | | 415/150 |
| 4,897,020 A * | 1/1990 | Tonks | ............... | F01D 5/186 |
| | | | | 415/115 |
| 5,366,176 A * | 11/1994 | Loewy | ............... | B64C 3/44 |
| | | | | 244/203 |
| 5,472,314 A * | 12/1995 | Delonge | ............... | F01D 17/162 |
| | | | | 415/115 |
| 6,045,325 A * | 4/2000 | Horvath | ............... | F01D 5/148 |
| | | | | 277/637 |
| 7,491,030 B1 * | 2/2009 | Pinera | ............... | F01D 5/147 |
| | | | | 415/161 |
| 7,942,632 B2 * | 5/2011 | Lord | ............... | F01D 5/146 |
| | | | | 415/156 |
| 9,617,868 B2 * | 4/2017 | Bloxham | ............... | F01D 17/14 |
| 2006/0045728 A1 * | 3/2006 | Martin | ............... | F04D 29/563 |
| | | | | 415/1 |
| 2009/0097967 A1 * | 4/2009 | Smith | ............... | F01D 17/162 |
| | | | | 415/145 |
| 2009/0104024 A1 * | 4/2009 | Kay | ............... | F01D 5/147 |
| | | | | 415/161 |
| 2014/0093364 A1 * | 4/2014 | Narehood | ............... | F01D 9/026 |
| | | | | 415/191 |

* cited by examiner

RIGID AND ROTATABLE VANES MOLDED WITHIN VARIABLY SHAPED FLEXIBLE AIRFOILS

This disclosure was made with Government support under Contract No. FA8650-09-D-2923-AETD awarded by the Department of the Air Force. The Government has certain rights in this disclosure.

TECHNICAL FIELD

This disclosure relates to both rigidly rotatable, stiff (or semi-stiff) vanes co-molded into conformable material, such as silicone rubber, to form variably shapeable airfoils for use such as in an aircraft engine fan.

BACKGROUND

One way to improve efficiency and stall margin of axial-flow turbines and compressors is by means of variable guide vanes which control blade incidence angle. Although the most commonly used type of variable guide vanes are stiff (relatively inflexible), whether rigidly mounted or axially rotatable, there does not appear to be any fully flexible variable guide vanes which are sufficiently beneficial so as to find their way into common use.

A hollow flexible vane with inner working parts, responsive to rotation of a trunion or rod, is disclosed in U.S. Pat. No. 3,237,918. A vane, comprised of a thin flexible material, is distorted into a desired shape in response to stressing one portion by movement thereof, while other portions remain rigidly attached to static structure, is disclosed in U.S. Pat. No. 3,723,021. A simple hinge which rotates the trailing edge of a vane is illustrated in U.S. Pat. No. 4,741,665. The foregoing disclosures appear to be unduly complex or difficult to produce.

A simpler design, in U.S. Pat. No. 7,942,632, includes stiff material, or compliant material such as silicone rubber, fixed to an arm at the bottom of the trailing edge of an airfoil, the arm being rotatable through a rod by a conventional unison ring disposed for slight rotation about the axis of a low bypass ratio, turbofan engine. The alteration of the airfoil shape in that case may be too limited to satisfy some utilization needs.

SUMMARY

An airfoil for a rotary fan or compressor has a circumferential thickness increasing from substantially nil at a trailing edge and decreasing to a leading edge, a radial length extending between a radially inward flank and a radially outward flank, and an axial width extending from the leading edge to the trailing edge. The airfoil includes a non-rotatable vane having a radial length which extends radially inwardly from the inward flank and radially outwardly from the outward flank, having an axial width substantially less than the axial width of the airfoil. The airfoil also includes at least one rotatable vane, having a radial length less than the radial length of the airfoil, having an axial width substantially less than the axial width of the airfoil, and including a rod extending from the vane radially outwardly from the outward flank. A solid, compliant, material is co-molded with the vanes in place and approximately centered in the airfoil mold, the thickness of each vane being less than the thickness of the airfoil at the respective position of each vane.

The airfoil may have the at least one rotatable vane in a position within said airfoil which is either closer to the trailing edge or closer to the leading edge of the airfoil than the position of the fixed vane.

The airfoil may have a first rotatable vane with a hollow rod having an inner diameter, and a second rotatable vane with a solid rod having an outer diameter less than the inner diameter of the hollow rod, and the solid rod having a radial length longer than the radial length of the first rotatable vane including its rod, wherein the first vane is positioned near the outer flank of the airfoil and the second vane is positioned near the inner flank of the airfoil with its solid rod passing through the hollow rod of the second vane. Or, the airfoil may have a first rotatable vane with a rod, and a second rotatable vane with a rod which has a radial length longer than the radial length of the first rotatable vane including its rod, and the first rotatable vane is positioned near the outer flank of the airfoil and the second rotatable vane is positioned near the inner flank of the airfoil with its rod axially forward of the first rotatable vane.

The airfoil is made by pre-forming the non-rotatable vane and at least one rotatable vane, then positioning said preformed vanes in a mold which has a cavity the shape of the airfoil, thereafter filling the mold with material which is fluent at molding temperature and which is solid and compliant at temperatures of the airfoil's intended use, and last, removing the airfoil from the mold.

The rotatable vanes may be in a position within said airfoil which is closer either to the trailing edge or the leading edge of the airfoil than the position of the fixed vane.

Positioning said preformed vanes in a mold comprises positioning a first rotatable vane having a hollow rod near the outer flank of the airfoil to be formed and positioning a second rotatable vane with a solid rod near the inner flank of the airfoil to be formed with its solid rod passing through the hollow rod of the first rotatable vane. Or, positioning said preformed vanes in a mold may comprise positioning a first vane with a rod near the outer flank of the airfoil to be formed and positioning a second rotatable vane near the inner flank of the airfoil to be formed with its rod forward of the first rotatable vane.

Other variations will become more apparent in the light of the following detailed description of exemplary embodiments, as illustrated in the accompanying drawings.

MODE(S) OF IMPLEMENTATION

Figure 1:
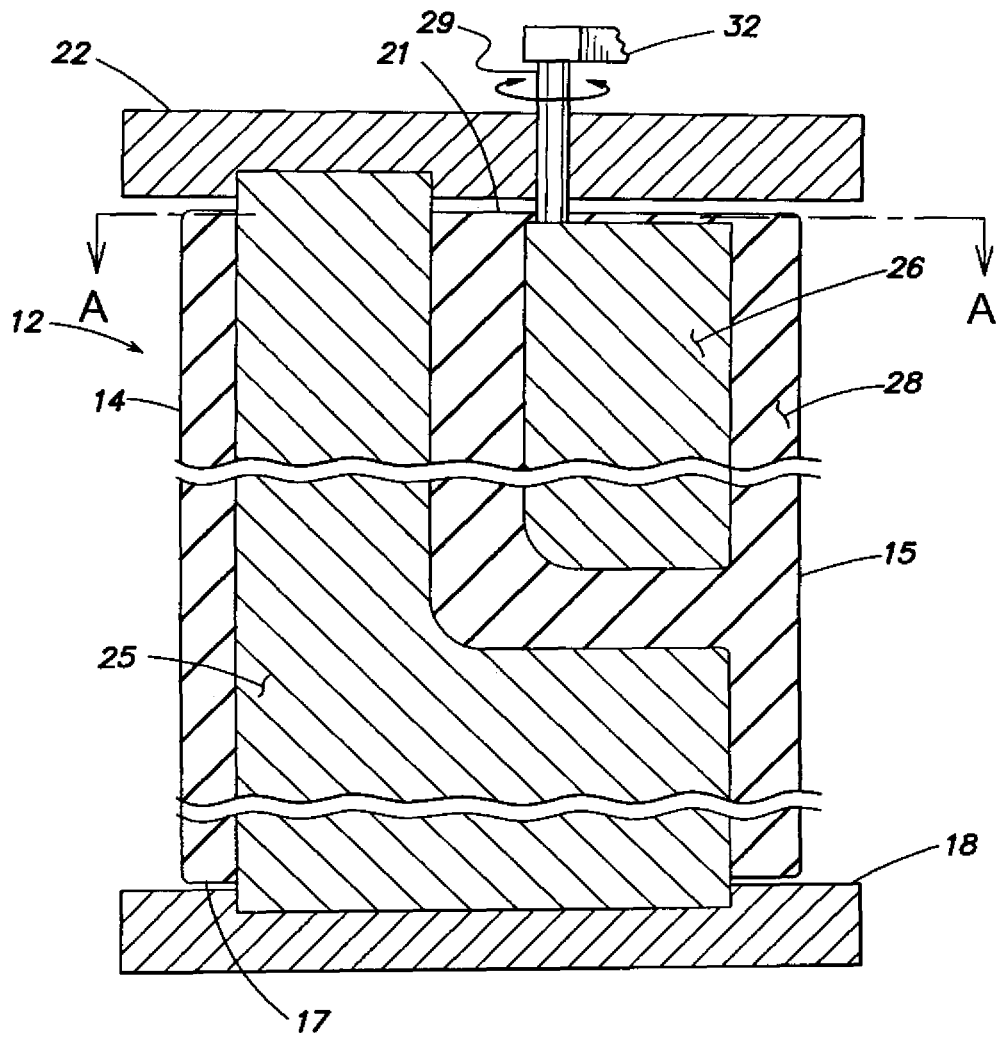
FIG. 1 is a sectioned, side elevation view of an airfoil, as if the parts were all in axial alignment, rather than having any camber.
Figure 2:
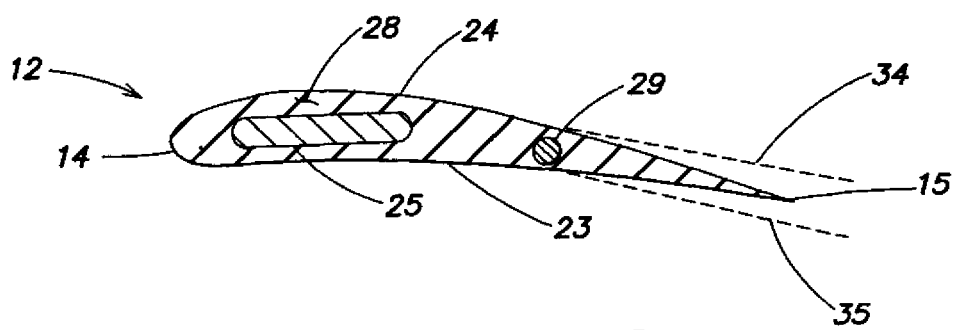
FIG. 2 is a sectional view taken on the line A-A of FIG. 1.

Referring to FIGS. 1 and 2, an airfoil 12 has a leading edge 14 and a trailing edge 15, its radially inner flank 17 is disposed adjacent an inner ring or hub 18 and its radially outer flank 21 is disposed adjacent a housing or outer ring 22. The airfoil has a pressure side 23 (FIG. 4) and a vacuum side 24.

The airfoil 12 has a rigidly disposed vane 25 and a rotatably disposed vane 26. The vanes 25, 26 are fully encased in a flexible, compliant material 28 which may, for instance, be silicone rubber. The vanes 25, 26 are inserts for being co-molded with the flexible material 28, in a conventional fashion in view of the teachings herein, thereby forming the airfoil 12.

The vane 26 is rotatable by an integral rod 29, typically having a full range of rotation on the order of 20° or 30°. The rod 29 is rotatable by an arm 32, an opposite end of which (not shown) may be moved axially by a conventional unison ring (not shown, also referred to as a guide ring, an indexing ring or a bucket ring), which is radially outward from the outer ring 22, or by other such means of applying a rotational torque along the axis of rod 29. When the rod 29 is rotated counterclockwise, the camber of the vane 12 is reduced, as illustrated schematically by the dotted line 34 in FIG. 2. When the rod 29 is rotated clockwise, the camber will increase as illustrated by the dotted line 35 in FIG. 2.

The portion of the compliant material 28 which surrounds the rotatable vane 26 will move with the vane 26. The compliant material surrounding the rigidly attached vane 25 will not move. The portion of the compliant material which is between the two vanes smoothes out the transition between the two vanes.

The rigidly attached vane 25 is illustrated in FIG. 2 as being of a constant thickness with similar rounded ends. However, it may be provided with more of a teardrop shape to conform more to the outer shape of the compliant material, though not so illustrated in FIG. 2. The rotatable vane 26 has a teardrop shape, conforming closely to the shape of that portion of the compliant material that makes up the trailing end and edge of the airfoil 12.

The shape of the vanes 25 and 26 (the silhouettes as seen in FIG. 1) may of course be altered to suit any desired implementation of the modality herein.

It should be noted that provision of the vanes 25, 26, as inserts for being used during the molding process, and their positioning within the mold is all well within the molding art, in view of the description herein. The vanes 25, 26 may be made of metal, or other rigid or semi-rigid material which may be cast, machined or produced by powder metallurgy or powder molding. The material is not important, so long as its strength at the desired thicknesses is not compromised, and the flexibility is no greater than that which is required for the design being implemented.

Figure 3:
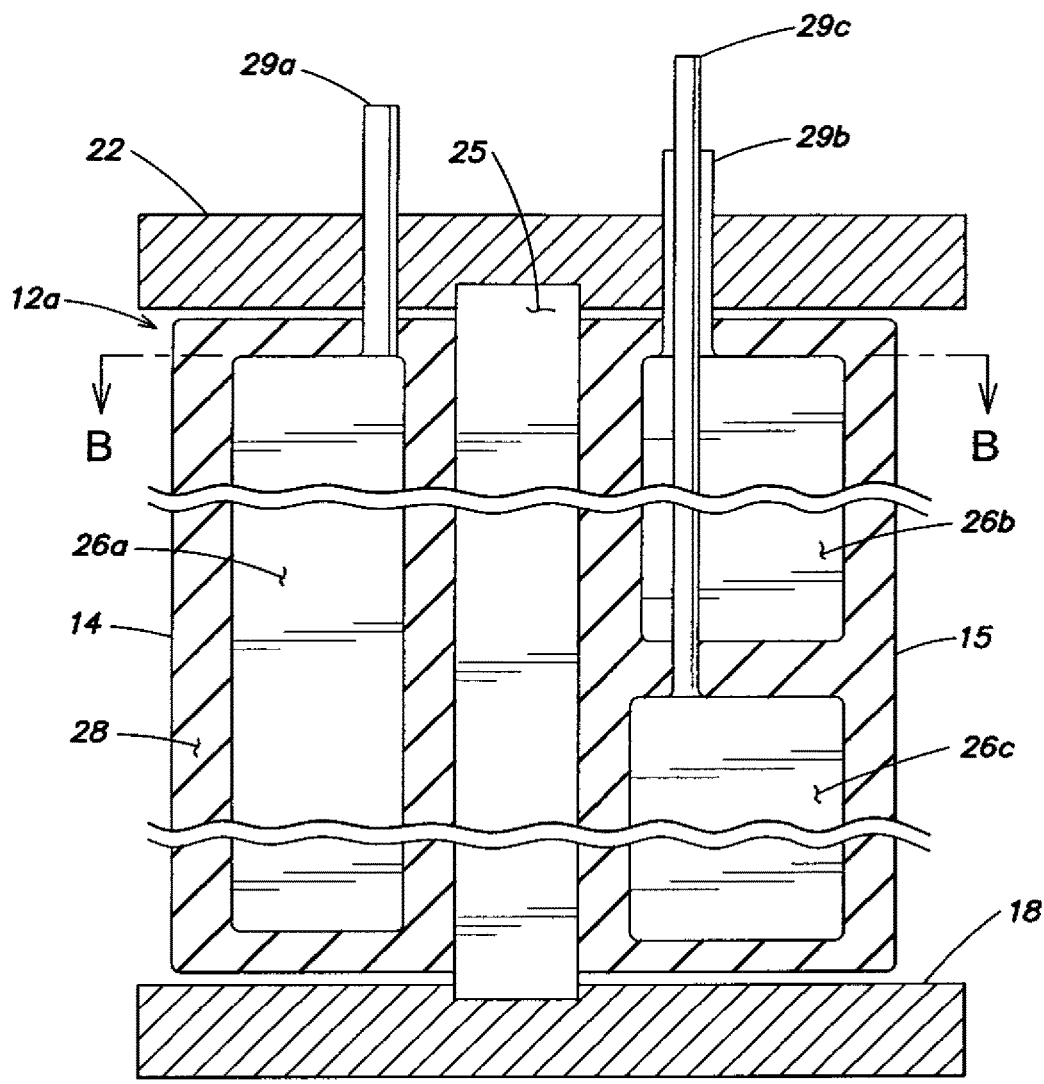
FIG. 3 is a sectioned, side elevation view of an airfoil, as if it were straightened out without any camber, having three rotatable vanes separated by a rigid vane.
Figure 4:
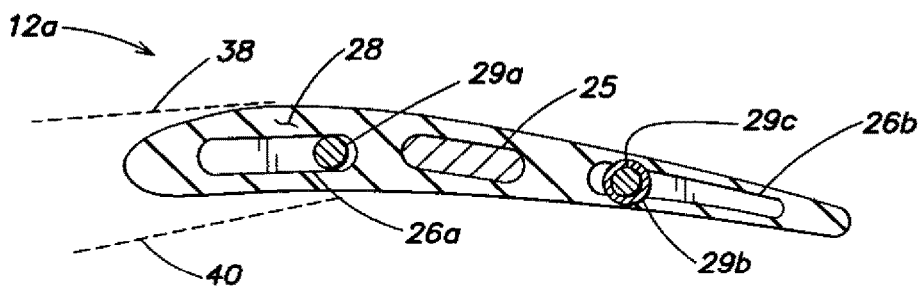
FIG. 4 is a sectional view taken on the line B-B in FIG. 3.

Referring to FIGS. 3 and 4, another embodiment has three rotatable vanes 26a-26c and one fixed vane 25. The rod 29b for rotating the vane 26b is enlarged and hollow so as to permit passage of the rod 29c for turning the vane 26c. Each of the rods 29a-29c are coupled by a corresponding arm 32 (FIG. 1) to a related one of a plurality of unison rings (not shown).

Figure 5:
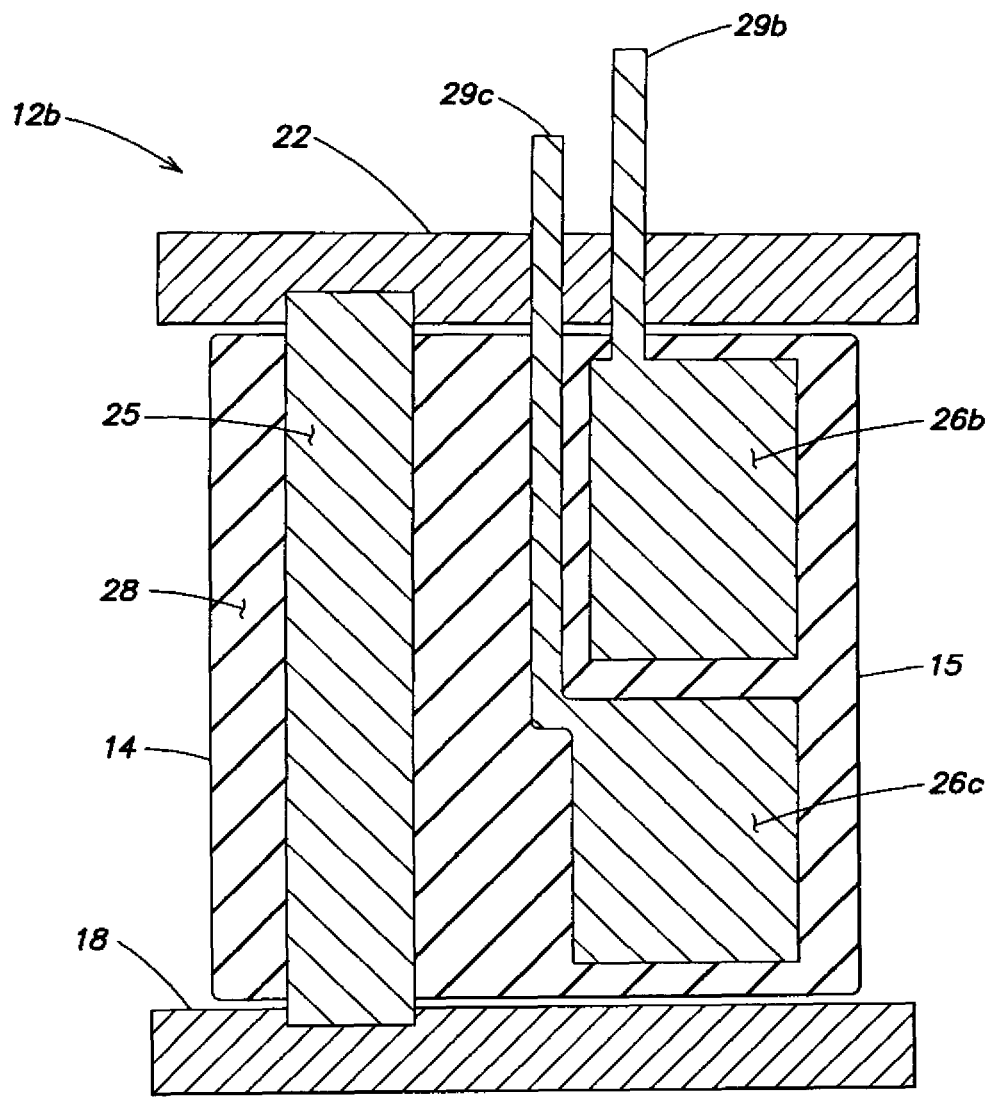
FIG. 5 is a sectioned side elevation view of a further embodiment having two vanes moveable by separated rods.

Rotation of the rod 29a in a clockwise direction will decrease the camber 40 between the vane 26a and the vane 25, as shown by the dotted line 38 in FIG. 4, while rotation of the rod 29a in a counterclockwise direction will increase the camber between the vane 26a and the vane 25, as shown by the dotted line 40. Rotation of either of the rods 29b and 29c will respectively alter the camber on the upper portion of the airfoil 12a or on the lower portion of the airfoil 12a, respectively. Having the upper and lower vanes 26b and 26c provides more flexibility. FIG. 5 illustrates that the rods 29b and 29c can be independent of each other, instead of being coaxial.

From the foregoing embodiments, it should be apparent that a wide selection of design choices of the number, shape, rotatability and positioning of vanes is available using the present methodology.

An airfoil 12-12b being molded is formed into the shape desired for it when the moveable vane or vanes therein are in their central or unrotated position. This will be a fail-safe position, since a resilient material such as silicone rubber has a long cold flow time and thereby retains resilience and will return to its molded shape when there is no contrary resistance applied to any rotatable vanes.

Since changes and variations of the disclosed embodiments may be made without departing from the concept's intent, it is not intended to limit the disclosure other than as required by the appended claims.

The invention claimed is:

1. An airfoil for a rotary fan or compressor, comprising:
a circumferential thickness increasing from nil at a trailing edge and decreasing to a leading edge, a radial length extending between a radially inward flank and a radially outward flank, and an axial width extending from the leading edge to the trailing edge;
characterized by:
a non-rotatable vane having a radial length which extends radially inwardly from the inward flank and radially outwardly from the outward flank, having an axial width less than the axial width of the airfoil;
at least one rotatable vane having a radial length less than the radial length of the airfoil, having an axial width less than the axial width of the airfoil, and including a rod extending from the at least one rotatable vane radially outwardly from the outward flank;
and a solid, compliant, molded material, co-molded with the non-rotatable vane and the at least one rotatable vane in place and circumferentially centered within a mold, the thickness of each vane of the non-rotatable vane and the at least one rotatable vane being less than the thickness of the airfoil at the respective position of said each vane.

2. An airfoil according to claim 1 further characterized in that:
said at least one rotatable vane is in a position within said airfoil which is closer to the trailing edge of the airfoil than a position of the non-rotatable vane.

3. An airfoil according to claim 1 further characterized in that:
said at least one rotatable vane is in a position within said airfoil which is closer to the leading edge of the airfoil than a position of the non-rotatable vane.

4. An airfoil according to claim 1 further characterized in that:
said at least one rotatable vane includes a first rotatable vane with a hollow rod having an inner diameter, and a second rotatable vane with a solid rod having an outer diameter less than the inner diameter of the hollow rod, and the solid rod having a radial length longer than the radial length of the first rotatable vane including the hollow rod; and
the first rotatable vane is positioned near the outer flank of the airfoil and the second vane is positioned near the inner flank of the airfoil with the solid rod passing through the hollow rod of the second rotatable vane.

5. An airfoil according to claim 1 further characterized in that:

said at least one rotatable vane includes a first rotatable vane with a first rod, and a second rotatable vane with a second rod which has a radial length longer than the radial length of the first rotatable vane including the first rod; and the first rotatable vane is positioned near the outer flank of the airfoil and the second rotatable vane is positioned near the inner flank of the airfoil with the second rod axially forward of the first rotatable vane including the first rod.

6. A method of forming an airfoil, characterized by:

pre-forming a non-rotatable vane which is to extend outwardly from inner and outer flanks of the airfoil to be formed, said non-rotatable vane to be rigidly secured in a hub and an outer ring of a rotary machine; and pre-forming at least one rotatable vane having a radial length less than a radical length of the airfoil, having an axial width less than an axial width of the airfoil, and including a rod extending from the at least one rotatable vane radially outwardly from the outward flank;

then, positioning said preformed non-rotatable vane and at least one rotatable vane in a mold which has an airfoil-shaped cavity having a radial length equal to a distance between the inner and outer flanks of the airfoil to be molded, an axial width to define a leading edge and a trailing edge of the airfoil to be molded, and a thickness which increases from nil at the trailing edge of the airfoil to be molded and decreases to the leading edge thereof;

thereafter, filling the mold with material which is fluent at molding temperature and which is solid and compliant at temperatures of the airfoil's intended use; and last, removing the airfoil from the mold.

7. A method according to claim 6 further characterized in that:

said at least one rotatable vane is in a position within said airfoil which is closer to the trailing edge of the airfoil than a position of the non-rotatable vane.

8. A method according to claim 6 further characterized in that:

said at least one rotatable vane is in a position within said airfoil which is closer to the leading edge of the airfoil than a position of the non-rotatable vane.

9. A method according to claim 6 further characterized in that:

the step of preforming at least one rotatable vane includes preforming a first rotatable vane with a hollow rod having an inner diameter, and preforming a second rotatable vane with a solid rod having an outer diameter less than the inner diameter of the hollow rod, and the solid rod having a radical length longer than the radial length of the first rotatable vane including the hollow rod; and the step of positioning said preformed non-rotatable vane and said at least one rotatable vane in a mold comprises positioning the first rotatable vane near the outer flank of the airfoil to be formed and positioning the second rotatable vane near the inner flank of the airfoil to be formed with the solid rod passing through the hollow rod of the first rotatable vane.

10. A method according to claim 6 further characterized in that:

the step of preforming at least one rotatable vane includes preforming a first rotatable vane with a first rod and a second rotatable vane with a second rod which has a radical length longer than the radial length of the first rotatable vane including the first rod; and the step of positioning said preformed non-rotatable vane and at least one rotatable vane in a mold comprises positioning the first rotatable vane near an outer flank of the airfoil to be formed and positioning the second rotatable vane near an inner flank of the airfoil to be formed with the second rod axially forward of the first rotatable vane.

* * * * *